Dec. 28, 1965  W. B. ERNST  3,225,741
LAYING CAGES

Filed Jan. 6, 1964  2 Sheets-Sheet 1

INVENTOR.
WILLIAM B. ERNST
BY John P. Chandler
HIS ATTORNEY.

Dec. 28, 1965  W. B. ERNST  3,225,741
LAYING CAGES
Filed Jan. 6, 1964  2 Sheets-Sheet 2
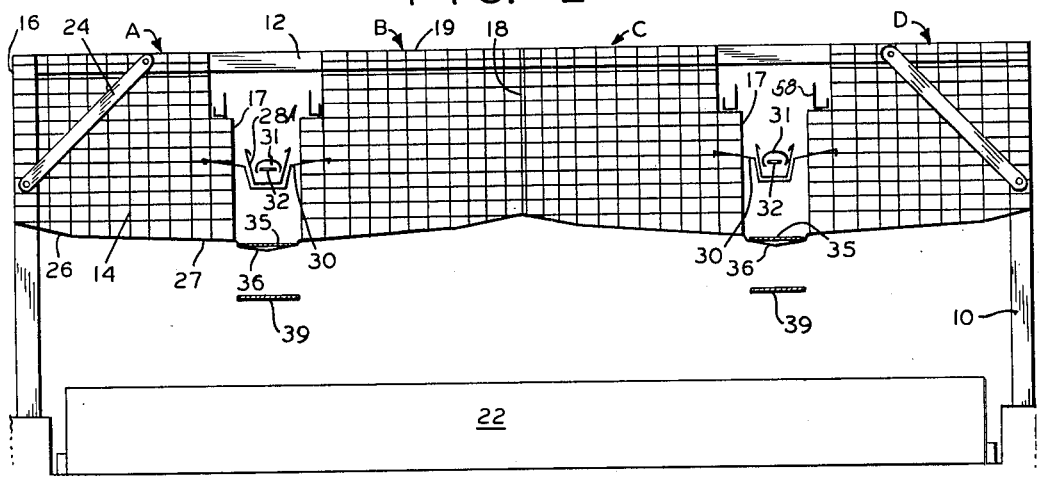
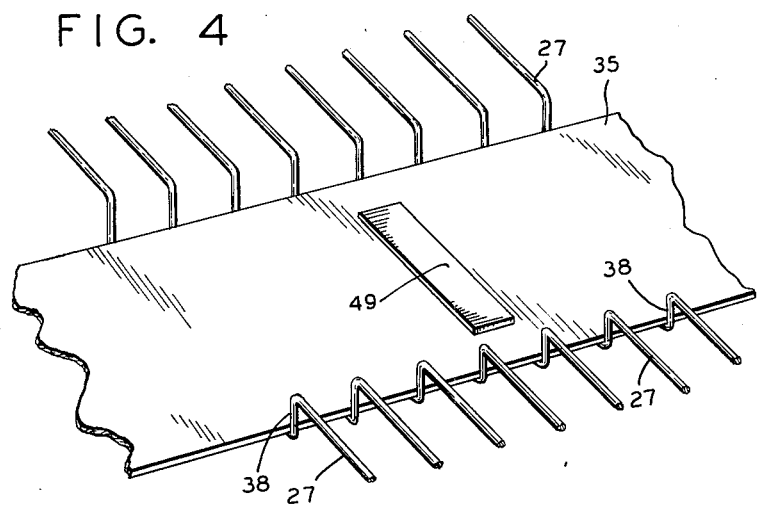
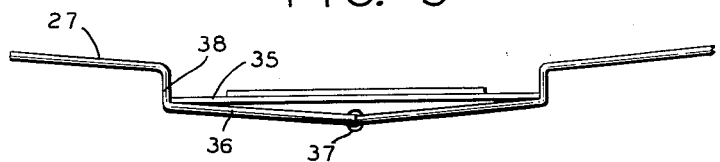
INVENTOR.
WILLIAM B. ERNST
BY John P. Chandler
HIS ATTORNEY.

United States Patent Office 3,225,741
Patented Dec. 28, 1965

3,225,741
LAYING CAGES
William B. Ernst, Owatonna, Minn., assignor to The National Ideal Company, Hicksville, Ohio, a corporation of Ohio
Filed Jan. 6, 1964, Ser. No. 335,893
1 Claim. (Cl. 119—48)

This invention relates to laying cages for poultry and has for its principal object the provision of a multi-compartment, unitary structure comprising a plurality of rows of compartments all located on a single plane and which is a marked improvement over the older types of laying cages and is a continuation-in-part of application 134,682, filed August 29, 1961, now abandoned.

The compartment structure of the present invention comprises two pairs of rows of separate cages including one row in each pair disposed in back-to-back relation with no space therebetween, and the outer row of each pair being spaced from the inner row by a channel of sufficient width to provide suitable space for three service units in superimposed relation. These units include egg gathering means comprising an elongated support of open wire grill construction and located at the lower end of the channel and which supports the upper course of an endless belt conveyor onto which the eggs roll from the cages on each side of the channel. The next service unit is a common feed trough for the individual cages on opposed sides of the channel, said trough being supplied with feed by an endless conveyor moveable up one row and down the other in each pair. Finally there is an effective watering arrangement for the individual cages.

An important object of the present invention is to provide a laying cage structure arranged in two pairs of rows wherein the feeding and watering of the chickens is greatly facilitated and the eggs are automatically delivered from the bottom walls of the cages by gravity onto the conveyor system without any possibility of the chickens soiling the conveyor, and hence, the eggs carried therein. This latter result is achieved by providing an imperforate panel at the lower ends of the opposed spaced walls at the fronts of the cages.

Another object of the invention is the provision of a more effective configuration of laying cages than has heretofore been achieved wherein the time required for servicing a relatively large number of chickens is greatly reduced over existing cage units.

In accordance with the present invention the watering, feeding and egg collecting is substantially automatic and the individual cages are disposed on one plane with top wall openings for easy installation and removal of the chickens. In this fashion the inner rows of the four bank arrangements are within easy hand access of the attendant from the aisle on each side of the unit.

A further object of the invention is to provide a unitary cage structure arranged in four banks or rows wherein a more effective use of available space of the laying house floor is achieved than with existing arrangements and wherein the eggs are automatically collected with minimum danger of breakage.

Two spaced rows or banks of cages with a single feed trough therebetween have been known but it has not been a compact structure where the parts including the cages, the feeders, the belt conveyor for the collection of the eggs are joined together in a unit.

Another important object of the invention is to provide a unit comprising four banks or rows of compartments divided into cage areas, all supported on a single frame structure in spaced relation to the building floor, and wherein access to the cages is facilitated and cleaning of the water trough and feed conveyors is simplified.

The supporting means comprises a plurality of spaced, transversely disposed frame members suitably supported as by legs along the opposed outer walls, the four rows of cages being sufficiently rigid to avoid the need for any intermediate legs.

The cage structure of the present invention is also novel in that its lower wall may be formed in one continuous piece extending across the four rows and the channels between the rows in each pair. The sections extending across said channels being downwardly recessed to form spaced abutments for guiding the egg conveyor belt.

In the drawings:

FIG. 2 is an end elevation showing the four rows of laying compartments and showing a modified shape of feed trough.

FIG. 4 is a broken perspective view of the belt conveyor and its supporting means for the egg collector.

FIG. 5 is an end elevation thereof.

Figure 1:
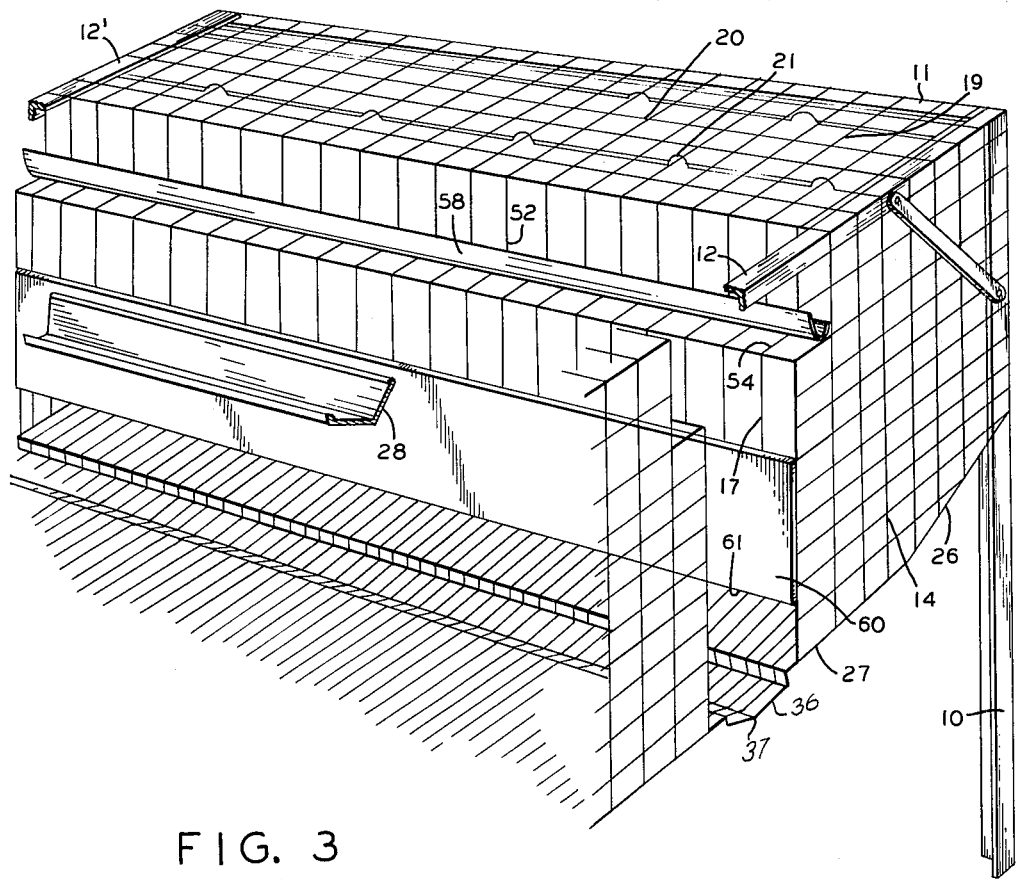
FIG. 1 is a broken perspective view of a laying cage structure embodying the present invention.

Referring now more particularly to FIGS. 1 and 2, the laying compartments are supported in spaced relation to the floor area on a frame formed of angle irons and comprising legs 10, longitudinal frames 11 and transverse frames 12. The compartments are formed from open wire grill screening of the kind normally used for chicken cages and having about a 1 by 2 inch mesh. When viewed from the end of the rows as in FIG. 2 there are four rows of compartments indicated at A, B, C and D. Each row has an end wall 14, a rear wall 16 running the full length of the rows, a continuous front wall 17, a central wall 18 running between the two inner rows, and a top wall 19 having doors 20 hinged at 21 in order to permit convenient access to the chickens in the individual compartments.

Legs 10 are of sufficient height to provide a suitable space for operation of a pit scraper, indicated generally at 22 (FIG. 2). There are also intermediate transverse frames 12′ and the frames and legs have diagonal reinforcing braces 24 for providing additional rigidity. The compartments in each row have bottom walls formed in two sections 26 and 27 and the bottom walls for all four rows may be formed in a single piece which extends over the channels between the two pairs of rows.

Figure 3:
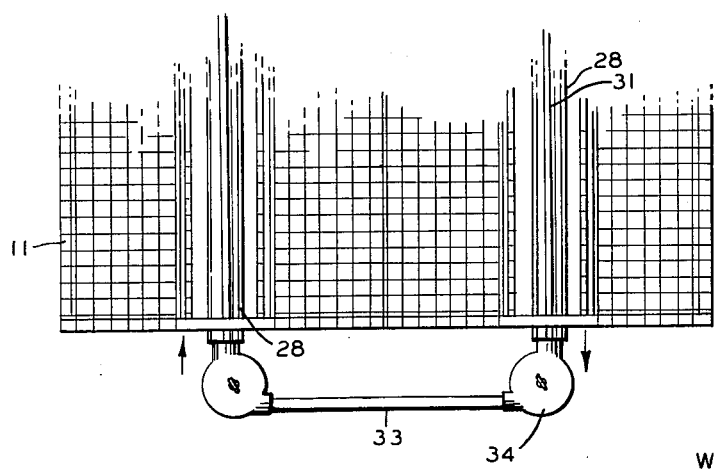
FIG. 3 is a broken plan view of the cage unit.

Between each of the two adjoining rows A–B and C–D there is a channel or space for an elongated feeding trough 28 and a belt conveyor 35 for the delivery of the eggs. The feeding trough 28 itself may be made from sheet metal and may have the cross-sectional contour shown in FIG. 1 which is generally V-shaped or it may have a more nearly rectangular contour as shown at 28A in FIG. 2. It is supported at spaced intervals by wire frames 30 suspended from front walls 17. The feed trough may be supplied with feed by suitable endless conveyor means, which conveyor means run down one feed trough and back the other. Since there are four rows of cages, A, B, C and D, one endless conveyor shown at 33 in FIG. 3, runs down between rows A and B and returns between the rows C and D. The conveyor comprises a tube 31 open at its bottom and having a chain 32 therein which moves the feed from a suitable hopper (not shown). The tube 33 extending between the two rows is, of course, closed. A corner structure 34 enables the chain to turn the corner.

The egg conveyor is an endless belt whose upper course 35 is supported for travel on a section 36 of the lower wall of the cage which extends across the channels. The lower course 39 of the endless belt may, if desired, be supported between its ends although no support is shown. It was earlier pointed out that this may be a continuous lower wall for all four rows, or it may be formed in sections joined together at 37. The wall section extending across the channels is downwardly recessed to form spaced abutments 38 to provide guiding means for the belt 35. The belt has blocks 49 to move the eggs along more expeditiously.

The front wall has an upper section 52 which is set back or recessed from section 17 and has generally the construction shown in my Patent No. 2,882,857. The shelf 54 afforded by this recessed arrangement forms an area for a watering trough 58 on each side of the channel and in this fashion water will not fall downwardly into the feed trough but rather will fall through the wires into the area below. The wire mesh in areas 52 and 17 is wide enough to permit the chicken to partake of drink and food but below the area 17 there is a solid wall area 60 of sheet metal or the like which prevents droppings from soiling the egg conveyor. The lower edge 61 of the solid wall 60 is spaced above lower wall 27 a sufficient distance to permit the eggs to roll onto the conveyor.

While there have been described herein what are at present considered preferred embodiments of the invention, it will be obvious to those skilled in the art that many modifications and changes may be made therein without departing from the essence of the invention. It is, therefore, to be understood that the exemplary embodiments are illustrative and not restrictive of the invention, the scope of which is defined in the appended claim, and that all modifications that come within the meaning and range of equivalency of the claim are intended to be included therein.

What I claim is:

A laying cage structure for chickens comprising two pairs of adjoining, elongated rows of separate compartments of open wire grill construction and provided with a common wall between the inner rows of each pair, the two rows in each pair being spaced from each other and forming a channel between two opposed front walls of the compartments, a bottom wall extending across all four rows and having central sections extending across the channels between the two pairs of rows and formed of spaced wire, a feeding trough in the channels extending the full length thereof and accessible to the chickens in both rows, an endless moveable conveyor which runs down the feeding trough in one channel and back in the other for supplying feed over the full length of the troughs in the two rows, watering troughs in the channels located above the feed trough, an endless egg conveyor belt in each channel and having a lower course and an upper course, the latter being supported on the spaced wires forming said central section of the lower wall for the cages extending across the channels, terminal sections of said spaced wires which are bent upwardly forming abutments limiting sidewise movement of the conveyor belt, each front wall of the rows of cages having an upper section formed of spaced vertical wires to permit the chickens to have access to the feeding trough, and a lower imperforate front wall section, said bottom wall for the cages being downwardly inclined toward the egg conveyor, the lower edge of said imperforate wall section being spaced from said bottom wall to permit eggs to roll from the bottom wall onto the conveyor.

References Cited by the Examiner

UNITED STATES PATENTS

| | | | |
|---|---|---|---|
| 2,591,609 | 4/1952 | Roberts et al. | 119—51 |
| 2,756,721 | 7/1956 | Hayes | 119—48 |
| 2,897,954 | 8/1959 | Cordis | 119—52 X |
| 2,918,037 | 12/1959 | Polley | 119—52 |
| 2,934,199 | 4/1960 | Winkler | 119—52 X |
| 2,973,742 | 3/1961 | Kaegebein | 119—48 |
| 3,003,464 | 10/1961 | Bailey | 119—52 |

SAMUEL KOREN, *Primary Examiner.*

ALDRICH F. MEDBERY, *Examiner.*